United States Patent
Boccuccia

(10) Patent No.: US 11,285,969 B2
(45) Date of Patent: Mar. 29, 2022

(54) AUTONOMOUS VEHICLE PROVIDING SAFETY ZONE TO PERSONS IN DISTRESS

(71) Applicant: Ford Global Technologies, LLC, Dearborn, MI (US)

(72) Inventor: Daniel Boccuccia, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 595 days.

(21) Appl. No.: 16/317,895

(22) PCT Filed: Jul. 19, 2016

(86) PCT No.: PCT/US2016/042945
§ 371 (c)(1),
(2) Date: Jan. 15, 2019

(87) PCT Pub. No.: WO2018/017060
PCT Pub. Date: Jan. 25, 2018

(65) Prior Publication Data
US 2021/0291874 A1    Sep. 23, 2021

(51) Int. Cl.
*B60W 60/00* (2020.01)
*E05F 15/73* (2015.01)
*B60R 25/24* (2013.01)
*B60W 40/08* (2012.01)
*E05B 81/56* (2014.01)

(52) U.S. Cl.
CPC ....... *B60W 60/00253* (2020.02); *B60R 25/24* (2013.01); *B60W 40/08* (2013.01); *B60W 60/0024* (2020.02); *E05B 81/56* (2013.01); *E05F 15/73* (2015.01); *B60W 2040/0872* (2013.01); *B60W 2420/42* (2013.01); *E05F 2015/763* (2015.01); *E05F 2015/765* (2015.01); *E05F 2015/767* (2015.01); *E05Y 2400/44* (2013.01); *E05Y 2400/52* (2013.01); *E05Y 2900/531* (2013.01)

(58) Field of Classification Search
CPC .......... B60W 60/00253; B60W 40/08; B60W 60/0024; B60W 2040/0872; B60W 2420/42; E05B 81/56; B60R 25/24; E05F 15/73; E05F 2015/763; E05F 2015/767; E05F 2015/765; E05Y 2400/52; E05Y 2900/531; E05Y 2400/44
USPC ......................................... 701/25
See application file for complete search history.

(56) References Cited

U.S. PATENT DOCUMENTS

| | | | | |
|---|---|---|---|---|
| 9,523,984 B1* | 12/2016 | Herbach | ............ | G05D 1/0088 |
| 2002/0026266 A1* | 2/2002 | Montague | ............ | G08B 25/006 701/1 |
| 2003/0158644 A1* | 8/2003 | Basson | ............ | G08B 13/19697 701/49 |
| 2016/0125735 A1* | 5/2016 | Tuukkanen | ............ | G08G 1/202 701/23 |

(Continued)

*Primary Examiner* — Muhammad Shafi
(74) *Attorney, Agent, or Firm* — Brandon Hicks; Eversheds Sutherland (US) LLP

(57) ABSTRACT

A method for automatically controlling a vehicle to provide a safety zone to an individual. The method detects, at the vehicle, a condition indicating that an individual outside of the vehicle is in distress. In response, one or more vehicle services are automatically made available to the individual. A corresponding system is also disclosed and claimed herein.

14 Claims, 7 Drawing Sheets

(56) References Cited

U.S. PATENT DOCUMENTS

2016/0187150 A1* 6/2016 Sherman ........ G06Q 10/063114
                                                          705/7.15

* cited by examiner

AUTONOMOUS VEHICLE PROVIDING SAFETY ZONE TO PERSONS IN DISTRESS

BACKGROUND

Field of the Invention

This invention relates to systems and methods for controlling autonomous vehicles to provide a safety zone to an individual.

Background of the Invention

Although still under development, autonomous vehicles are anticipated as providing a means for increasing traffic efficiencies by reducing traffic congestion, avoiding traffic collisions caused by human driving errors, and reducing costs of human labor. Autonomous vehicles may also reduce the need for vehicle parking space and increase availability of transportation to individuals constrained by physical limitations such as age, handicap, intoxication, or the like. Finally, autonomous vehicles may reduce the effect of vehicle emissions on the environment by limiting both the number of cars on the road and wasteful vehicle use.

Despite these much-anticipated and widely-recognized benefits, however, demand for autonomous vehicle usage may be low at certain times of the day or night or in less-populated areas. This may result in autonomous vehicles being available, but unused. There may also be times where autonomous vehicles are unoccupied while in transit to another area, for example.

Crime prevention is a top priority of many governments and law enforcement agencies worldwide. Various public campaigns have been implemented to provide temporary safe havens for children and other vulnerable individuals at risk of danger. One crime prevention program, for example, provided owners of houses and apartments that had cleared a background check and wanted to participate in the program with an easily-recognizable image or sticker to place in their window. The image or sticker easily identified qualified participants in the crime prevention program and was used to inform passersby that the house was deemed "safe." Children were educated at school and community events to go to these houses when they felt threatened or in need of help.

In view of the foregoing, what are needed are systems and methods to expand usage of autonomous vehicles during periods of reduced demand, when unoccupied, or under emergency circumstances. Ideally, such systems and methods would benefit communities by providing temporary safe havens to women, children, and other vulnerable individuals in crisis. Further needed are systems and methods to automatically re-locate such individuals to a safe location and to notify bystanders or authorities as appropriate.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
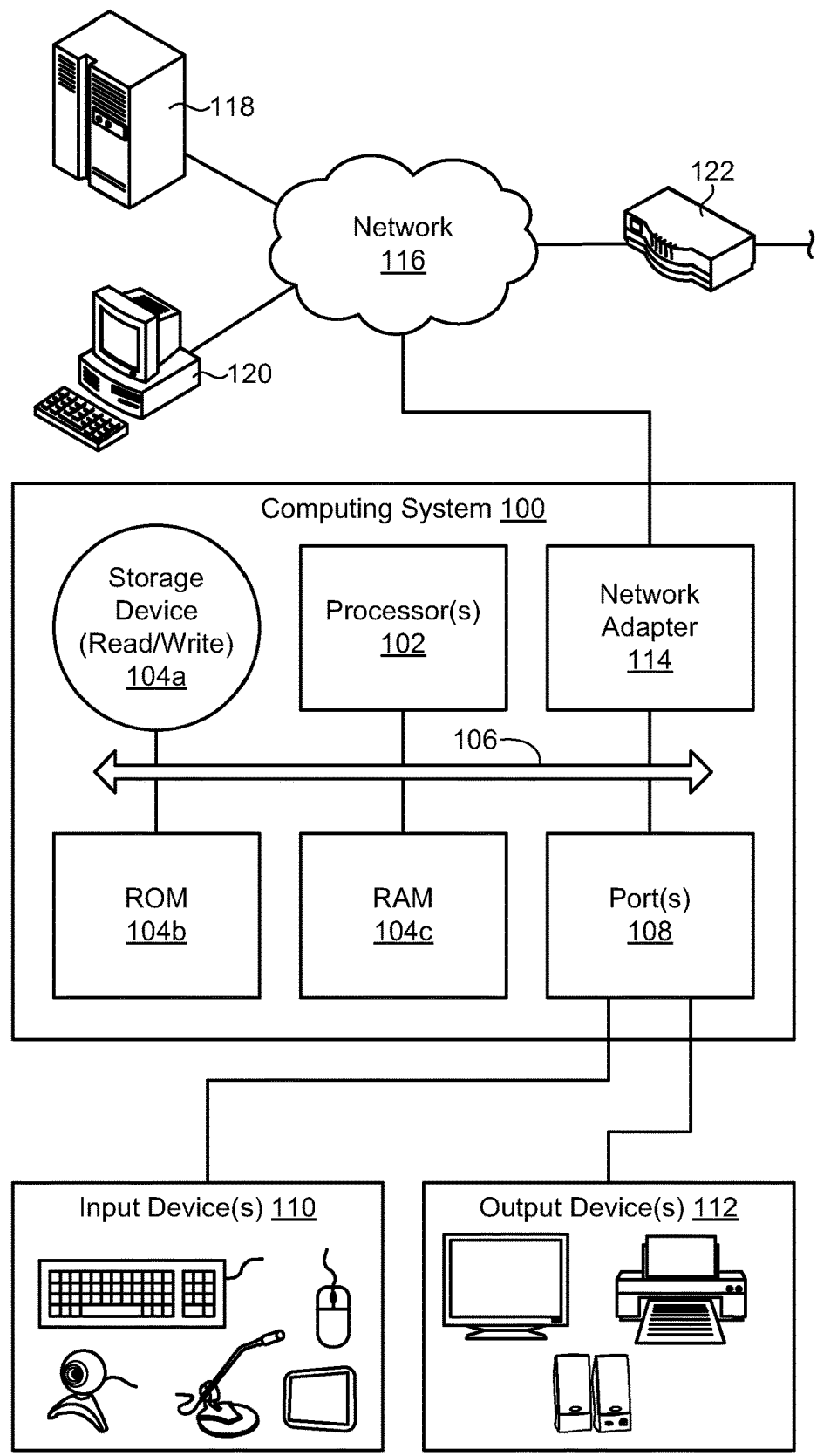
FIG. 1 is a high-level block diagram showing one example of a computing system in which a system and method in accordance with the invention may be implemented.

Referring to FIG. 1, one example of a computing system 100 is illustrated. The computing system 100 is presented to show one example of an environment where a system and method in accordance with the invention may be implemented. The computing system 100 may be embodied as a mobile device 100 such as a smart phone or tablet, a desktop computer, a workstation, a server, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

As previously mentioned, many benefits are anticipated in connection with the continued emergence and development of autonomous vehicles. Some unanticipated benefits may be provided by re-purposing autonomous vehicles during periods of reduced demand for regular autonomous vehicle usage, when the autonomous vehicle is unoccupied, or under emergency circumstances. Ideally, such autonomous vehicles may be configured to provide temporary safe havens for vulnerable individuals under such circumstances, as provided by the methods and systems herein described.

Figure 2:
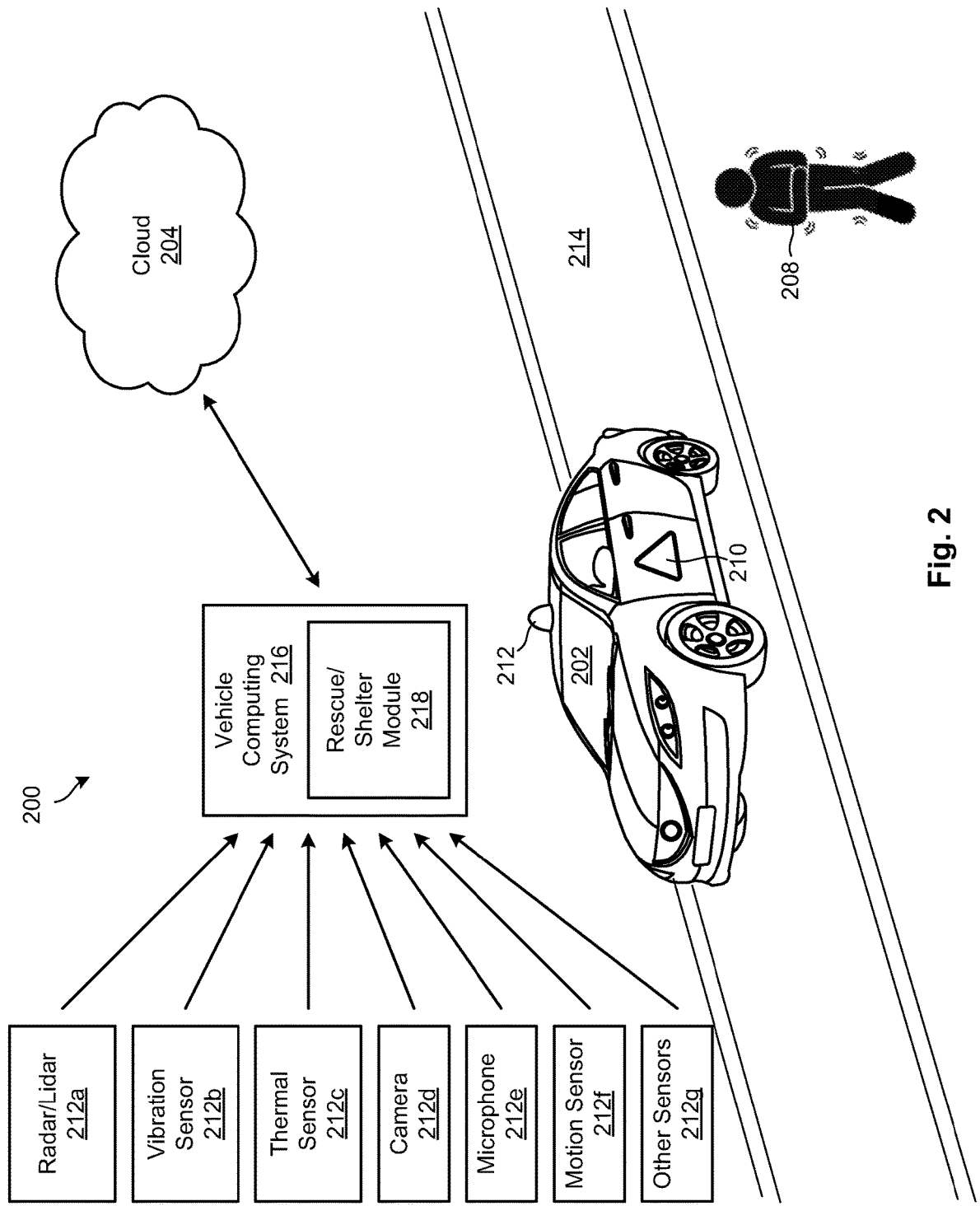
FIG. 2 is a perspective view of one embodiment of an autonomous vehicle utilizing vehicle-mounted sensors to provide a safety zone for individuals in distress.

Referring to FIG. 2, in certain embodiments, a system 200 in accordance with the invention may include an autonomous vehicle 202 configured to sense its environment and navigate without human intervention or instruction. For example, an autonomous vehicle 202 may use various sensors 212 such as radar, lidar, GPS, odometry, and computer vision, to identify appropriate navigation paths, avoid obstacles, and obey signage. An autonomous vehicle 202 may also include an internal vehicle computing system 216 to analyze and apply the sensory data gathered from the sensors 212 as needed for navigation.

In some embodiments, autonomous vehicle 202 sensors 212 may be configured to gather data needed to recognize complexities of human behavior and situational danger, in addition to environmental conditions pertinent to navigating traffic. In certain embodiments, a rescue/shelter module 218 may be included in the vehicle computing system 216. Using the data from the sensors 212, the rescue/shelter module 218 may be configured to detect different types of situations external to the vehicle 202 and take appropriate actions.

In particular, the rescue/shelter module 218 may be configured to detect situations of distress and/or danger involving one or more individuals 208 and provide assistance such as temporary shelter, protection from environmental conditions or dangerous individuals or predators, emergency transportation to relief facilities or safety zones, and the like. Because autonomous vehicles 202 may already be providing autonomous vehicle 202 services on the road 214, these vehicles 202 may be also particularly well-suited to providing relief to vulnerable individuals. In this way, the services provided by autonomous vehicles 202 may be expanded to provide services beyond those for which autonomous vehicles 202 were originally contemplated.

For example, in certain embodiments, the autonomous vehicle 202 sensors 212 may include radar/lidar sensors 212a, vibration sensors 212b, thermal sensors 212c, camera sensors 212d, microphone sensors 212e, motion sensors 212f, and other sensors 212g. Each of these sensors 212 may send data gathered from the external environment to the vehicle computing system 216, where such data may undergo processing to detect unexpected, unusual, and potentially dangerous situations.

For example, radar/lidar sensors 212a may be configured to determine the position, speed, and other features and characteristics of objects, persons and vehicles in the surrounding environment. This data may allow the vehicle computing system 216 to distinguish between a child and an adult or male and female, for example, based on physical norms such as height and proportion.

Vibration sensors 212b may measure vibration data. This data may be communicated to the vehicle computing system 216 and used to detect, for example, a gunshot, a thud, or other indications of dangerous circumstances. Thermal sensors 212c may utilize infrared temperature sensing technology, for example, to detect persons or other living things in the surrounding environment by measuring thermal output and providing thermal imaging to the vehicle computing system 216.

Camera sensors 212d may be equipped to gather images of human facial expressions and changes in the surrounding environment to detect unusual circumstances or behavior. The camera sensors 212d may communicate with the vehicle computing system 216 to detect human emotions and behavior indicating potential danger or vulnerability such as fear, hostility, sadness, and the like. The camera sensors 212d may also detect objective evidence of danger, such as personal injury, the presence of a weapon, etc.

Microphone sensors 212e may be configured to collect audio data of environmental sounds including, for example, human voices and sounds of distress like yelling, screaming, or crying. Microphone sensors 212e may also gather objective evidence of distress or danger in the surrounding environment. In some embodiments, microphone sensors 212e may communicate with the vehicle computing system 216 to perform voice recognition or the like.

Motion sensors 212f may gather motion data to detect the presence of one or more individuals 208 in need of assistance, or other persons or objects in the surrounding environment. In some embodiments, motion sensors 212f may gather motion data from weather phenomena or the like. Other sensors 212g may include pressure sensors, sonar sensors, and other sensors known to those in the art that may be intelligently utilized by embodiments of the invention to recognize one or more individuals 208 in danger or otherwise in need of assistance.

As shown, an autonomous vehicle 202 in accordance with the invention may include an identification element 210 identifying the vehicle 202 as one equipped to function as a temporary "safe haven" for one or more individuals 208 in crisis. The identification element 210 may include, for example, an image, signage, an alphanumerical designation, a predetermined color, or any other element known to those in the art capable of identifying an autonomous vehicle 202 equipped to provide a safety zone to distressed persons in accordance with embodiments of the invention.

Figure 3:
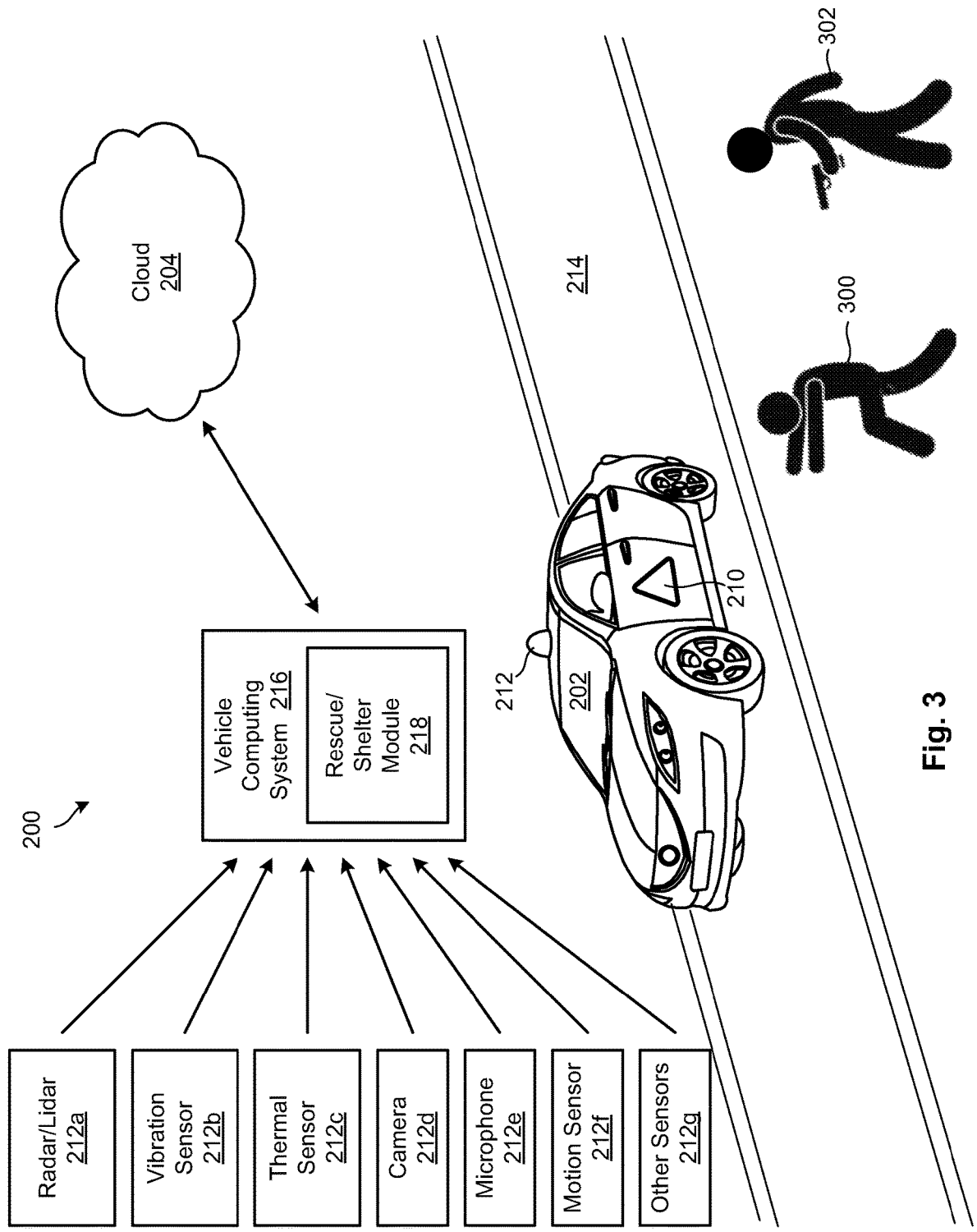
FIG. 3 is a perspective view of a second embodiment of an autonomous vehicle utilizing vehicle-mounted sensors to provide a safety zone.

Referring now to FIG. 3, in one embodiment, the autonomous vehicle 202 sensors 212 may gather data indicating a victim 300 being pursued by one or more aggressors 302. For example, the radar/lidar sensors 212a may detect the presence of the victim 300 and aggressors 302 and may assess a distance between the victim 300 and the aggressors 302, and between the victim 300 and the autonomous vehicle 202. The radar/lidar sensors 212a may further gather data indicating that the victim 300 has proportions and height characteristics of a woman, while the aggressors 302 have proportions and height characteristics consistent with men. In other embodiments, the aggressors 302 may be one or more non-human predators.

The thermal sensors 212c may indicate or confirm the presence of persons in the surrounding environment, and may gather additional data showing that the victim 300 and aggressors 302 are approaching the autonomous vehicle 202. Vibration sensors 212b may detect vibrations consistent with a gunshot. Camera sensors 212d may detect images consistent with the data gathered by the other sensors 212. The camera sensors 212d may also show a weapon carried by at least one of the aggressors 302. The microphone sensors 212e may detect yelling, crying, and the sound of a gunshot, while the motion sensors 212f may detect continuous motion consistent with the data gathered by the other sensors 212.

The information and data gathered by the sensors 212 may be received by the rescue/shelter module 218. The rescue/shelter module 218 may then analyze this data to recognize different situations and individuals 208 that may require assistance. Alternatively, or additionally, various types of data may be forwarded to a cloud server where different processing tasks may be performed. For example, all or part of the functionality of the rescue/shelter module 218 may be implemented within the cloud 204. Certain tasks may be performed locally by the vehicle computing system 216, while other tasks may be performed by a more efficient manner in the cloud 204. As an example, facial or voice recognition may be performed more efficiently in the cloud 204 since these tasks are typically processor intensive and may require access to large databases of information.

Once the autonomous vehicle 202 has assessed the information, it may determine an appropriate response. Upon identifying one or more individuals 208 in crisis, the autonomous vehicle 202 may automatically unlock and/or open its doors to receive the distressed individual 208. Once inside, the autonomous vehicle 202 may automatically close and/or lock the doors. If needed, the autonomous vehicle 202 may transport the individual 208 away from the dangerous situation, or to a facility such as a police station, a hospital, a permanent shelter, or the like.

In some embodiments, the autonomous vehicle 202 may sound an alarm, notify appropriate authorities, or notify family members of the distressed individual 208. For example, the autonomous vehicle 202 may sound the horn or activate another external alarm to alert bystanders to potential criminal activity or a crime in progress. The autonomous vehicle 202 may also automatically initiate a telephone call, electronic messaging, or the like to notify the police, a hospital, a crisis center, or other facility of the situation. In certain embodiments, the autonomous vehicle 202 may allow the distressed individual 208 to make a telephone call or electronically notify family members of the situation.

Figure 4:
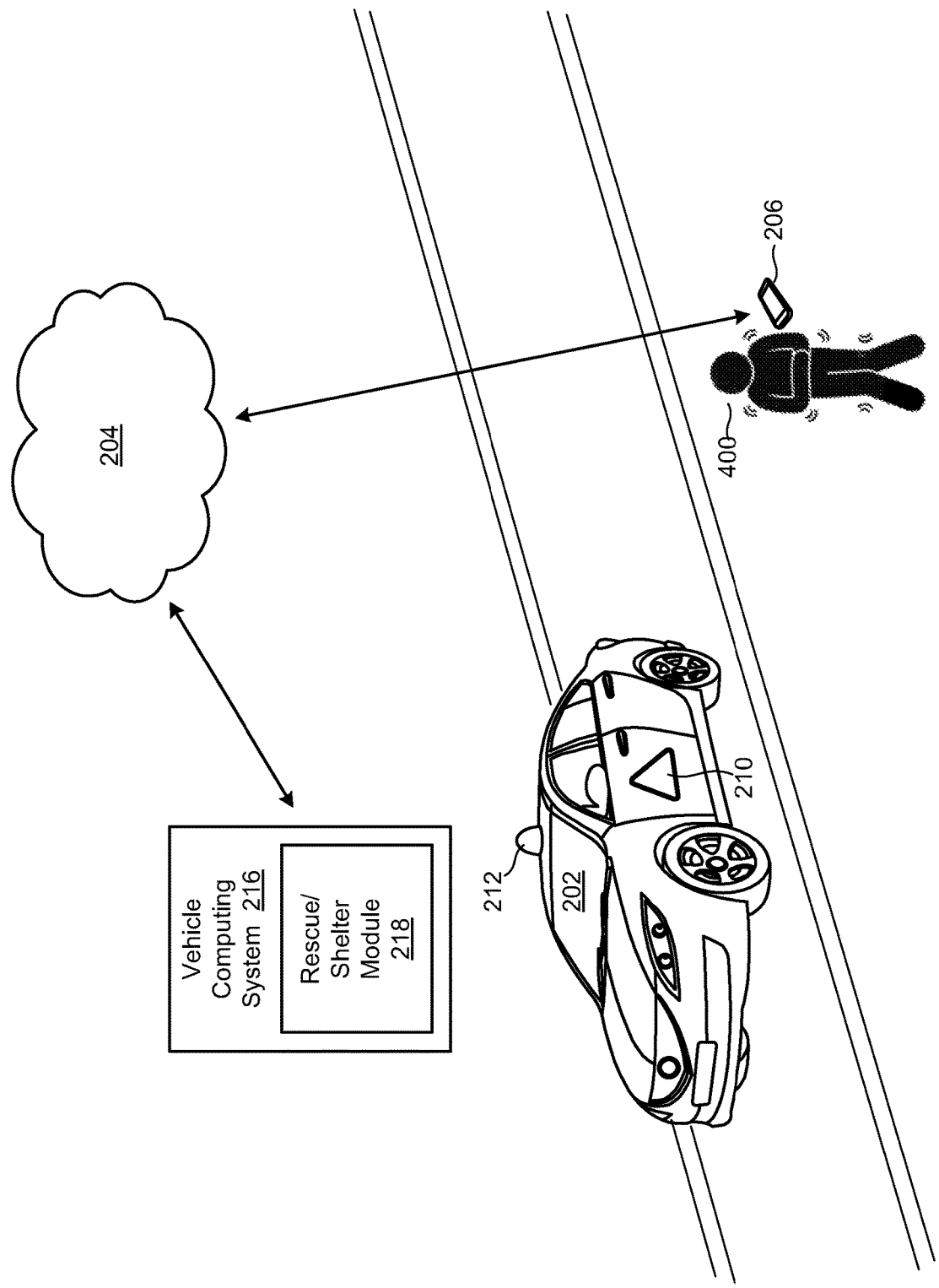
FIG. 4 is a perspective view of a third embodiment of an autonomous vehicle providing a safety zone when triggered by a mobile device.

Referring now to FIG. 4, in certain embodiments, the functionality of the rescue/shelter module 218 may be triggered by mobile device 206 carried by an individual 400. The mobile device 206 such as a smart phone, a tablet computer, a laptop, a smart watch, or the like, carried by an individual 400, may communicate with the rescue/shelter module 218 through the cloud 204. The mobile device 206 may communicate with the cloud 204 over a cellular network, data network, or other suitable network.

In certain embodiments, a panic button or other similar functionality may be provided by the mobile device 206 to enable an individual 400 to indicate a state of distress or emergency. When the individual 400 activates this panic button, resources in the mobile device 206 and/or cloud 204 may find an available autonomous vehicle 202 within the vicinity of the individual 400. This may be accomplished by comparing a location of the individual 400 with the locations of autonomous vehicles 202 in the area and selecting the autonomous vehicle 202 with the closest driving distance to the individual 400. In this way, an autonomous vehicle 202 may be summoned to an individual 400 in distress without the use of the vehicle's 202 external sensors 212.

In some embodiments, information identifying the selected autonomous vehicle 202, its current location, approximate time and/or distance to the individual's 400 location, an alternate pick-up location, or the like, may be returned to the mobile device 206 of the individual 400 via the cloud 204. The individual 400 may utilize this information to close any gap in distance between the individual 400 and the autonomous vehicle 202, and to properly identify the autonomous vehicle 202 when it arrives.

Figure 5:
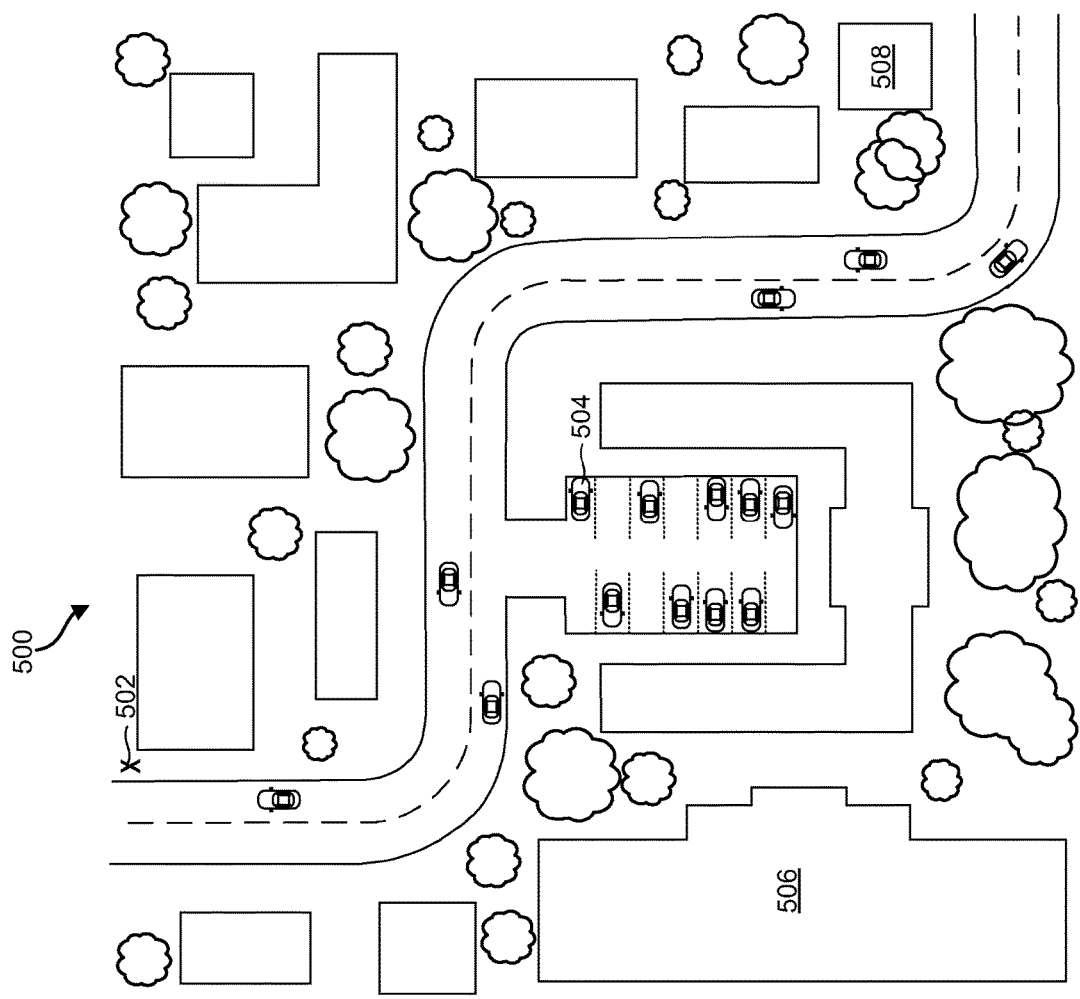
FIG. 5 is a top view of a map depicting use of an autonomous vehicle to provide a safety zone in accordance with certain embodiments of the invention.

In addition to responding to and protecting an individual 400 in distress, an autonomous vehicle 202 in accordance with embodiments of the present invention may be used to transport an individual 400 in distress away from danger and to a safe facility or zone equipped to provide appropriate care. FIG. 5 depicts one embodiment of a system 500 for transporting an individual 400 in distress from a dangerous location 502 to a safe location or facility such as a hospital 506 or police station 508.

As shown in FIG. 5, an individual 400 may encounter a dangerous situation at a remote location 502. In one embodiment, the individual 400 may press a panic button or the like on a personal mobile device 206 to summon an autonomous vehicle 202 equipped to provide a safety zone to persons in distress in accordance with the present invention. A signal associated with the panic button may be sent to a cloud server in communication with a fleet of autonomous vehicles 202. The cloud server may identify an autonomous vehicle 504 in closest driving proximity to the individual 400. The cloud server may then notify the identified autonomous vehicle 504 of the location of the individual 400 in distress so the identified vehicle 504 can navigate to the individual 400.

The identified autonomous vehicle 504 may be parked, idle or in transit. In the event the closest autonomous vehicle 504 is in transit, the vehicle's 504 current task may be terminated to enable the vehicle 504 to respond to the distressed individual 400 or situation. Another autonomous vehicle 202 may then be dispatched to perform the job of the identified autonomous vehicle 504. The rescue/shelter module 218 may ensure that the identified autonomous vehicle 504 called to respond to the distressed individual 400 or situation is unoccupied so as not to bring a passenger closer to a potentially dangerous situation.

As the autonomous vehicle 504 nears the individual 400, the autonomous vehicle 504 may use its external sensors 212 to recognize additional information associated with the distressed individual 400 or situation, as described above with reference to FIGS. 2 and 3. Once the autonomous vehicle 504 processes the additional information, it may determine an appropriate course of action. For example, the autonomous vehicle 504 may transport the individual 400 to a local hospital 506 in the event it recognizes trauma, shock, or emotional distress, or may transport the individual 400 to a police station 508 in the event it recognizes criminal activity.

Figure 6:
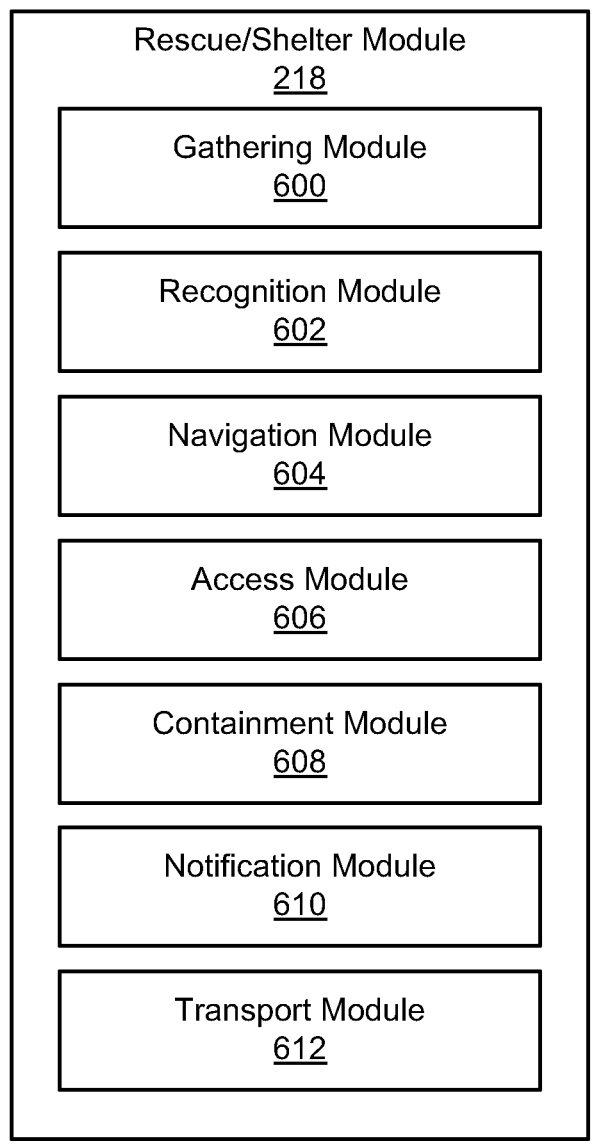
FIG. 6 shows modules for providing various features and functions of a system in accordance with certain embodiments of the invention.

Referring now to FIG. 6, a system in accordance with the invention may include various modules to provide different features and functions. The functionality of these modules may be implemented in one or more of the mobile device 206, cloud server 204, and vehicle computing system 216. The modules may include one or more of a gathering module 600, recognition module 602, navigation module 604, access module 606, containment module 608, notification module 610 and transport module 612. These modules may be implemented in hardware, software, firmware, or combinations thereof. The modules are presented by way of example and are not intended to represent an exhaustive list of modules that may be included within the system. The system may include more or fewer modules than those illustrated, or the functionality of the modules may be organized differently.

The gathering module 600 may gather data from the various sensors 212 of an autonomous vehicle 202. As described above with reference to FIG. 2, the sensor 212 data may include radar/lidar data, vibration data, thermal data, camera or video data, microphone or audio data, motion data, and the like.

The recognition module 602 may receive the data from the gathering module 600 and process it to recognize dangerous situations and/or persons in distress. In some embodiments, the recognition module 602 may apply different weights to the various sensor 212 data. The weighted data may then be input into one or more algorithms to identify a person in distress and/or to recognize a situation as dangerous or potentially dangerous to an individual 208.

Upon recognizing an individual 208 in distress or a dangerous situation, the navigation module 604 may navigate the autonomous vehicle 202 to the location of the distressed individual 208. In some embodiments, the navigation module 604 may send information to a mobile device 206 belonging to the distressed individual 208 to identify the dispatched autonomous vehicle 202, its current location, approximate time and/or distance to the individual's 208 location, an alternate pick-up location, or the like.

An access module 606 may provide the distressed individual 208 with access to the autonomous vehicle 202 by, for example, automatically unlocking and/or opening at least one vehicle 202 door or providing a security access code to the individual 208 via the mobile device 206. The access module 606 may also provide access to the functionality of the autonomous vehicle 202, such as the ability to make telephone calls or send electronic messages, and access to amenities such as air conditioning, heating, radio, and the like.

A containment module 608 may contain the distressed individual 208 within the autonomous vehicle 202 by, for example, automatically closing and locking the vehicle 202 doors. In this manner, the containment module 608 may remove and isolate the individual 208 from a dangerous or potentially dangerous environment and thereby protect the individual 208 from harm.

The notification module 610 may automatically notify appropriate authorities based upon the data gathered from the sensors 212 and the assessment performed by the recognition module 602. For example, if the recognition module 602 determines that a crime has taken place, the notification module 610 may notify the police so that they may take appropriate action. If the recognition module 602 determines that there is a medical emergency, the notification module 610 may notify the local hospital that the distressed individual 208 is en route or, in some embodiments, may request an ambulance or other emergency vehicle at the scene.

The transport module 612 may use the autonomous vehicle 202 to automatically transport the distressed individual 208 to a safe location or facility such as a hospital, police station, or shelter, if indicated by the recognition module 602.

Figure 7:
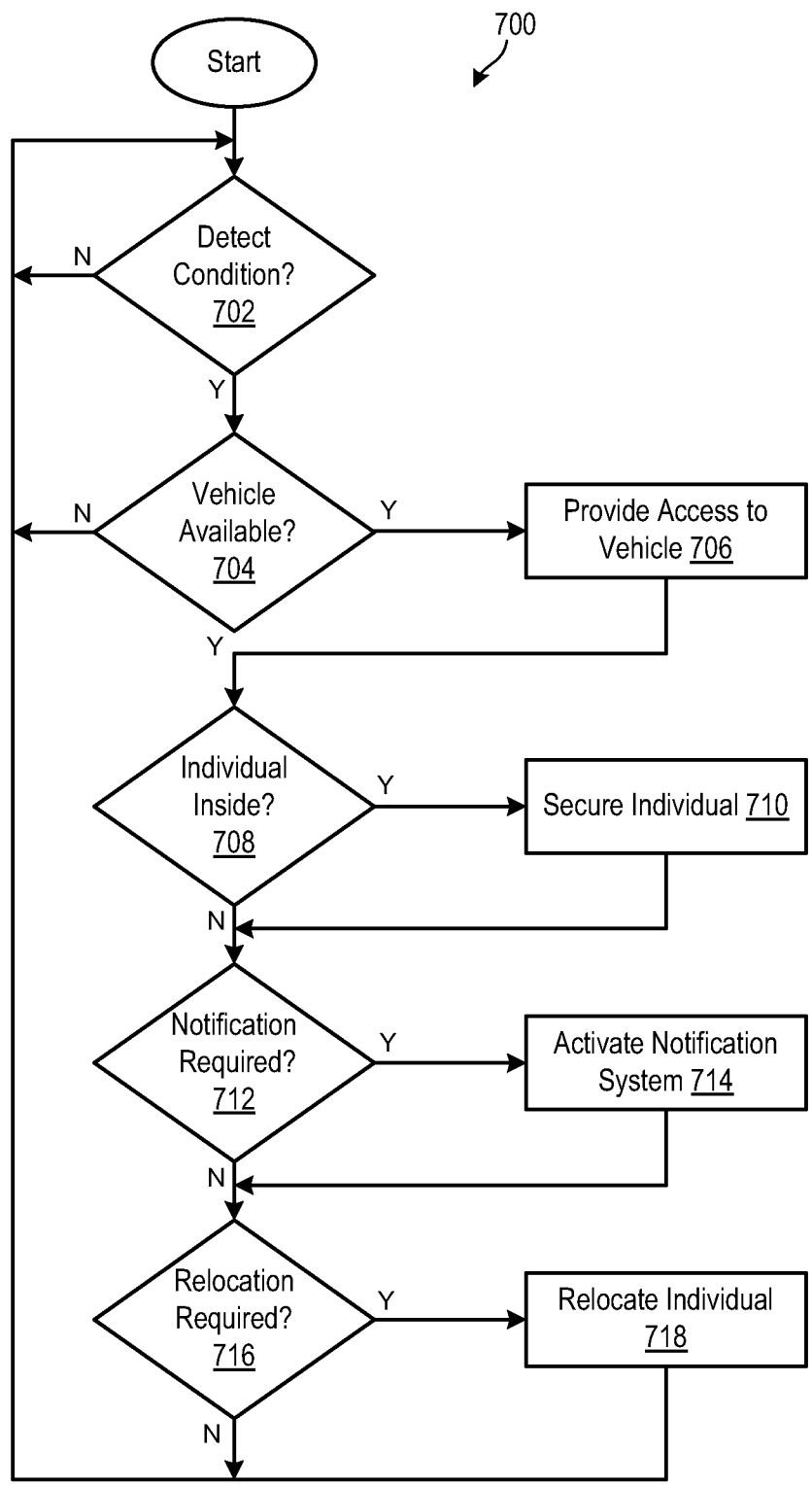
FIG. 7 is a flow chart showing a process for controlling an autonomous vehicle to provide a safety zone to an individual in distress in accordance with certain embodiments of the invention.

Referring now to FIG. 7, a method 700 in accordance with embodiments of the invention may include detecting 702 in an individual 208 or the surrounding environment one or more conditions indicating that the individuals 208 is in distress or danger. Detecting 702 a condition may include, for example, detecting a facial expression, a loud noise, a distressed voice, an individual being victimized by another person or predator, or the like. The data needed to detect such a condition may be gathered by sensors 212 coupled to the vehicle 202, or may be directly provided by an individual 208 by pressing a panic button on a mobile device 206, for example. If no condition is detected 702, the method 700 may continue to monitor the environment to detect 702 a condition.

If such a condition or combination of conditions is detected 702, the method 700 may next determine whether a vehicle is available 704. This step 704 may include querying a fleet of vehicles 202 to determine whether a vehicle 202 is in the vicinity of the distressed individual and unoccupied. If no vehicle 202 is available, the method 700 may return to monitoring gathered data to detect 702 a condition. If a vehicle 202 is available, however, the method 700 may provide 706 access to the vehicle 202. Access may be provided 706 by, for example, navigating an available autonomous vehicle 202 to the individual 208 and automatically unlocking and/or opening a door. In some embodiments, providing 706 access to the autonomous vehicle 202 may include providing a security access code or other instruction to the individual 208 to allow the individual 208 to enter the vehicle 202.

The method 700 may then query whether the individual 208 is inside 708 the autonomous vehicle 202. If yes, the autonomous vehicle 202 may secure 710 the individual 208 inside the vehicle 202 by, for example, automatically closing and/or locking the vehicle 202 doors. If no, the method 700 may then query whether notification 712 of authorities is required. As discussed above, notification 712 of authorities may be required where, for example, a crime has been committed, there is a medical emergency, or the like. If notification 712 is required, the vehicle 202 notification system may be activated 714 to alert the proper authorities and/or bystanders.

The method 700 may then query whether relocation 716 of the individual 208 is required. Relocation 716 may be required where, for example, the individual 208 is in immediate danger, injured, very young, elderly, incapacitated, or other exigent circumstances exist. If relocation 716 is required, the autonomous vehicle 202 may relocate the individual 208 to a safe location or facility such as a hospital, police station, shelter, or the like. If not, the autonomous vehicle 202 may permit the individual 208 to remain isolated therein for a predetermined period of time, or until data gathered by the sensors 212 indicate that it is safe for the individual 208 to exit the vehicle 202.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for automatically controlling a vehicle to provide a safety zone to an individual, the method comprising:
   detecting, at a vehicle, a condition indicative of an individual in distress, wherein the individual is external to the vehicle;
   determining that the vehicle is already in transit to a different location;
   terminating a current task of the vehicle;
   re-routing the vehicle to a first location of the individual;

automatically opening a door of the vehicle to provide entrance to the individual and closing and locking the door of the vehicle to prevent subsequent entry to the vehicle in response to the condition; and automatically transporting the individual to a second location.

2. The method of claim 1, wherein detecting comprises obtaining information from at least one sensor coupled to the vehicle, wherein the at least one sensor is selected from the group consisting of an optical sensor, a thermal sensor, a video sensor, and an audio sensor.

3. The method of claim 2, wherein the condition comprises at least one physical characteristic of the individual, the physical characteristic including at least one of: a facial expression of the individual or a tone of a voice of the individual.

4. The method of claim 1, wherein detecting comprises receiving a notification from a requesting device.

5. The method of claim 1, further comprising automatically moving the vehicle toward the individual.

6. The method of claim 1, further comprising automatically alerting at least one of an emergency responder and a bystander.

7. The method of claim 1, wherein detecting the condition further comprises detecting a second individual that is at least one of: within a threshold distance from the individual or in pursuit of the individual.

8. The method of claim 1, wherein detecting the condition further comprises detecting a vibration on or external to the vehicle.

9. A system for providing a vehicle safety zone to an individual, the system comprising:

at least one processor hosted by a vehicle; and at least one memory device operably coupled to the at least one processor and storing instructions for execution on the at least one processor, the instructions causing the at least one processor to:

detect a condition indicative of an individual in distress, wherein the individual is external to the vehicle;

determine that the vehicle is already in transit to a different location;

terminate a current task of the vehicle;

re-route the vehicle to a first location of the individual;

automatically open a door of the vehicle to provide entrance to the individual and close and lock the door of the vehicle to prevent subsequent entry to the vehicle in response to the condition; and automatically transport the individual to a second location.

10. The system of claim 9, wherein detecting comprises obtaining information from at least one sensor coupled to the vehicle, wherein the at least one sensor is selected from the group consisting of an optical sensor, a thermal sensor, a video sensor, and an audio sensor.

11. The system of claim 9, wherein the condition comprises at least one physical characteristic of the individual, the physical characteristic including at least one of: a facial expression of the individual or a tone of a voice of the individual.

12. The system of claim 9, wherein detecting comprises receiving a notification from a requesting device.

13. The system of claim 9, further comprising automatically available comprises automatically moving the vehicle toward the individual.

14. The system of claim 9, wherein the instructions further cause the at least one processor to automatically alert at least one of an emergency responder and a bystander.

* * * * *